United States Patent

[11] 3,628,390

| [72] | Inventors | Cornelis Van Der Lely<br>7, Bruschenrain, Zug;<br>Hendricus Jacobus Cornelis Nieuwenhoven,<br>Baar, both of Switzerland |
|---|---|---|
| [21] | Appl. No. | 887,571 |
| [22] | Filed | Dec. 23, 1969 |
| [45] | Patented | Dec. 21, 1971 |
| [32] | Priority | Jan. 2, 1969 |
| [33] | | Netherlands |
| [31] | | 6900003 |

[54] VARIABLE RATIO TRANSMISSIONS
14 Claims, 14 Drawing Figs.

[52] U.S. Cl. ................................................ 74/230.17 A, 74/230.17 D
[51] Int. Cl. .................................................. F16h 55/22
[50] Field of Search........................................... 74/230.17 D, 217 CV, 230, 17 A

[56] References Cited
UNITED STATES PATENTS

| 2,639,569 | 5/1953 | Pasturczak | 74/230.17 D X |
| 2,900,832 | 8/1959 | Snartemo | 74/230.17 D |
| 3,263,763 | 8/1966 | Adams, Jr. | 74/230.17 D X |
| 3,295,384 | 1/1967 | Love et al. | 74/230.17 D |
| 3,301,077 | 1/1967 | Caughlin | 74/230.17 D |
| 3,364,766 | 1/1968 | Ramo | 74/230.17 D |

*Primary Examiner*—Leonard H. Gerin
*Attorney*—Mason, Mason & Albright

ABSTRACT: This invention relates to variable ratio transmissions intended for use in agricultural implements.

PATENTED DEC 21 1971
3,628,390
SHEET 1 OF 5
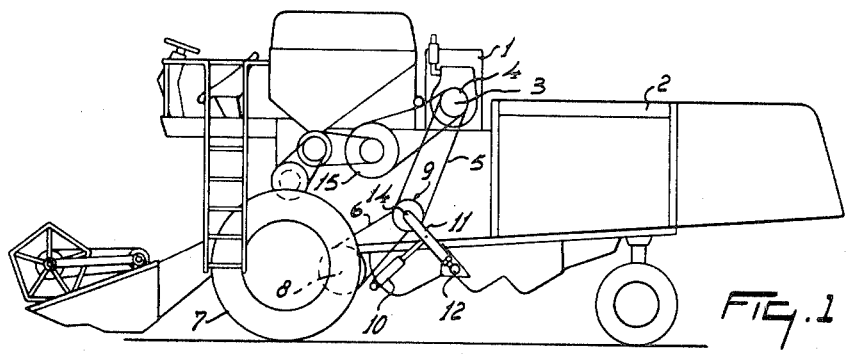
FIG. 1
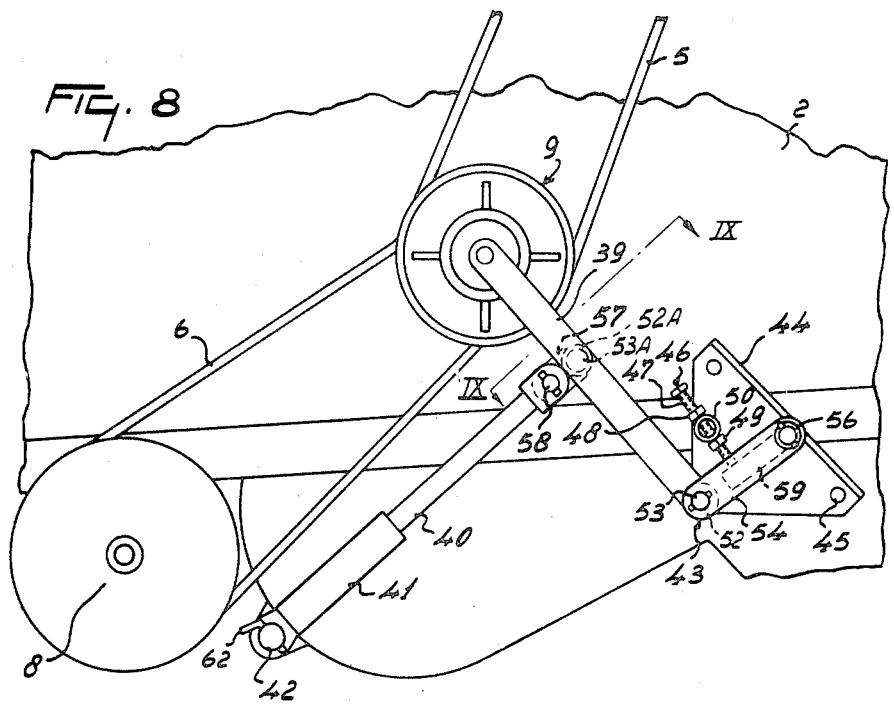
FIG. 8
FIG. 9
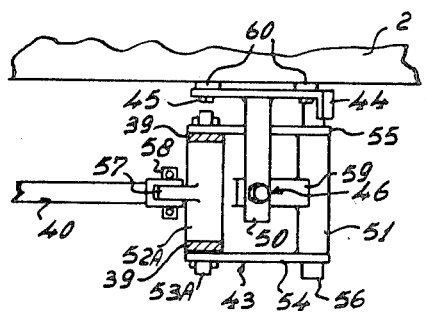
INVENTORS
CORNELIS VAN DER LELY
HENDRICUS JACOBUS CORNELIS NIEUWENHOVEN
by Mason, Mason & Albright
Attorneys INVENTORS
CORNELIS VAN DER LELY
HENDRICUS JACOBUS CORNELIS NIEUWENHOVEN
by Mason, Mason & Albright
Attorneys INVENTORS
CORNELIS VAN DER LELY
HENDRICUS JACOBUS CORNELIS NIEUWENHOVEN
by Mason, Mason & Albright
Attorneys

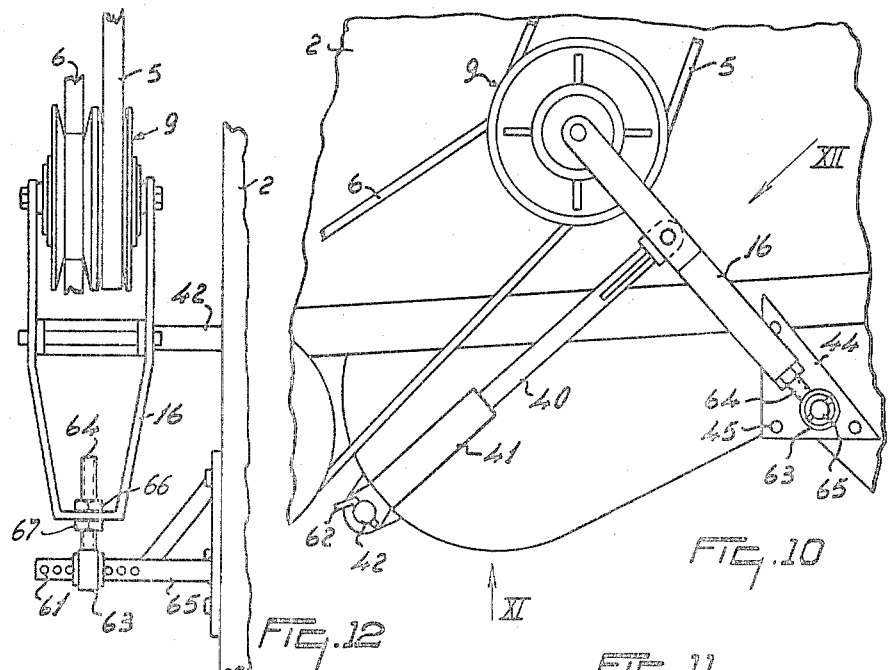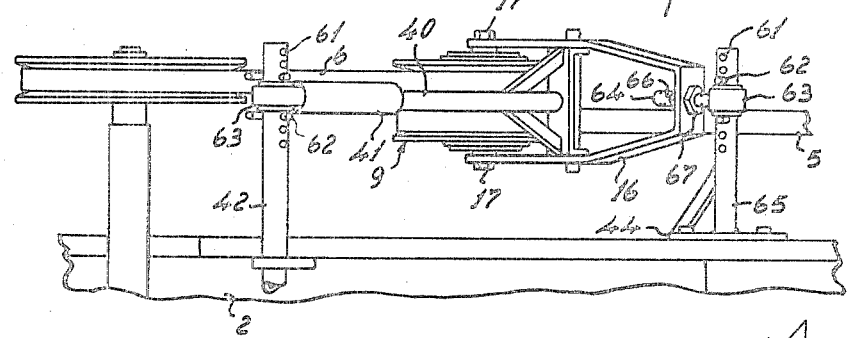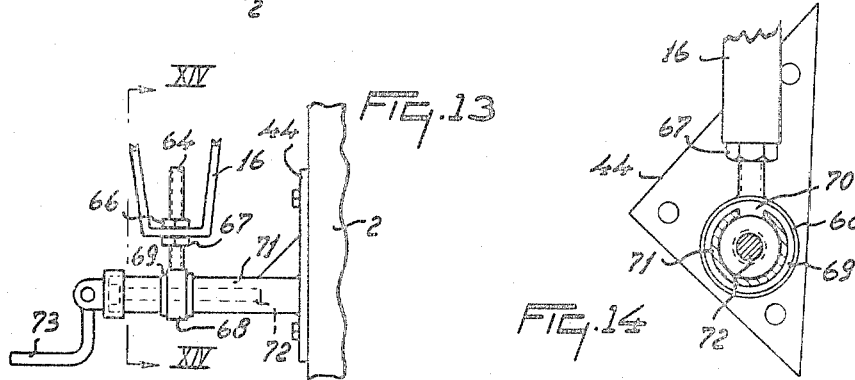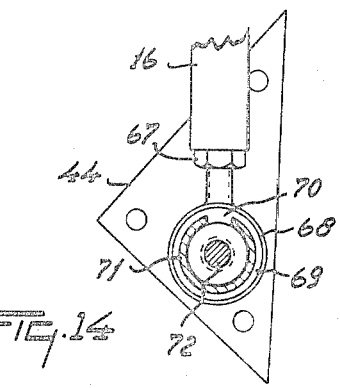

VARIABLE RATIO TRANSMISSIONS

According to the invention, there is provided an infinitely variable ratio transmission intended for use in an agricultural implement, the transmission comprising a central shaft affording the axis of rotation of two discs that are spaced apart from one another therealong, and also comprising a third disc located between said two discs so as to be movable axially along said shaft, the discs effectively affording two pulleys arranged to cooperate with driving and driven V-belts or the like, wherein at least one coupling member interconnects said two discs in such a way as to ensure rotation of the third disc therewith independently of the tensions existing in said V-belts or the like during use of the transmission, the coupling member or members being arranged to drive the third disc positively with said other two discs.

For a better understanding of the invention, and to show how the same may be carried into effect, reference will now be made, by way of example, to the accompanying drawings, in which:

BRIEF DESCRIPTION OF THE DRAWINGS

FIG. 1 is a side elevation of a combine harvester provided with a variable ratio transmission in accordance with the invention;

FIG. 8 is a fragmentary side elevation showing an alternative form of control mechanism for the variable ratio transmission of the combine harvester of FIG. 1 to an enlarged scale and in greater detail;

FIG. 9 is a section taken on the line IX—IX of FIG. 8;

FIG. 10 corresponds to FIG. 8 but shows an alternative form of control mechanism;

FIG. 11 is a underside plan view as seen in the direction indicated by an arrow XI in FIG. 10;

FIG. 12 is a view as seen in the direction indicated by an arrow XII in FIG. 10;

FIG. 13 illustrates part of a control mechanism that may be used to provide a fine adjustment for a variable ratio transmission in accordance with the invention; and FIG. 14 is a section taken on the line XIV—XIV of FIG. 13.

DESCRIPTION OF THE PREFERRED EMBODIMENTS

Figure 2:
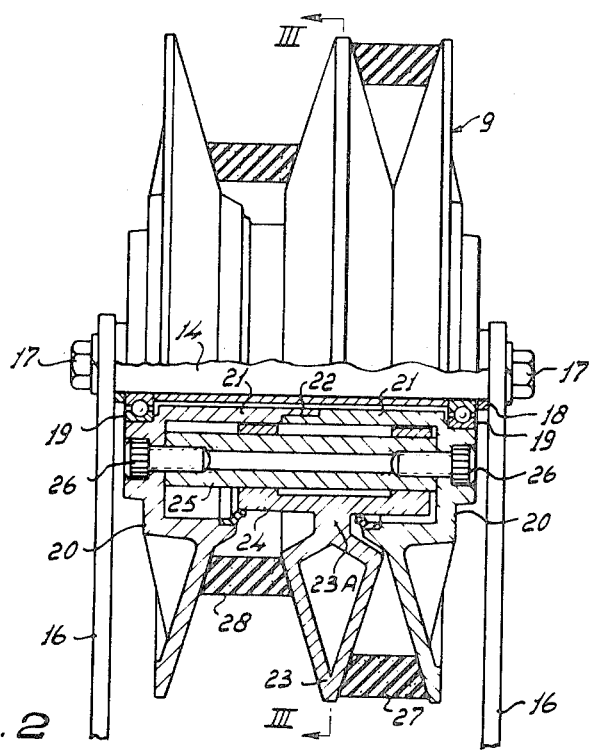
FIGS. 2, 4 and 6 are sectional or part-sectional elevations showing three different embodiments of variable ratio transmissions in accordance with the invention.

Referring to FIG. 1 of the drawings, the agricultural implement (which is illustrated as an example of one to which the invention may be applied) is a combine harvester 2 having an internal combustion engine 1 provided with a rotary output shaft 3. A pulley 4 is mounted on the shaft 3 and is arranged to rotate front-driven ground wheels 7 of the harvester through the intermediary of V-belts or the like 5 and 6. The ground wheels 7 are driven from a shaft upon which a pulley 8 is mounted, a variable ratio transmission 9 in accordance with the invention being interposed between the pulleys 4 and 8, motion being given to said transmission 9 from the V-belt or the like 5 and being derived from said transmission 9 by way of the V-belt or the like 6. As will be described in greater detail below, the transmission 9 effectively includes two automatically variable diameter pulleys and control of the transmission ratio is effected by turning a control arm 11, at the end of which the variable ratio transmission 9 is rotatably mounted, about a substantially horizontal pivot 12 with the aid of a pivotally mounted hydraulic or other fluid pressure operated piston and cylinder assembly 10. It will be realized that extension or retraction of the piston of the assembly 10 will cause the variable ratio transmission 9 to be moved through a circular path centered upon the pivot 12 with a consequent alteration in the effective diameters of the two pulleys from which it is principally formed. This will, of course, result in an increase or decrease in the speed of rotation of the ground wheels 7 in response to a constant speed of rotation of the rotary output shaft 3 of the engine 1. It can be seen from FIG. 1 of the drawings that several pulley and belt or like transmissions 15 are employed to drive other moving parts of the combine harvester and it will be understood that any of these may, if desired, include a variable ratio transmission similar to the transmission 9.

Figure 3:
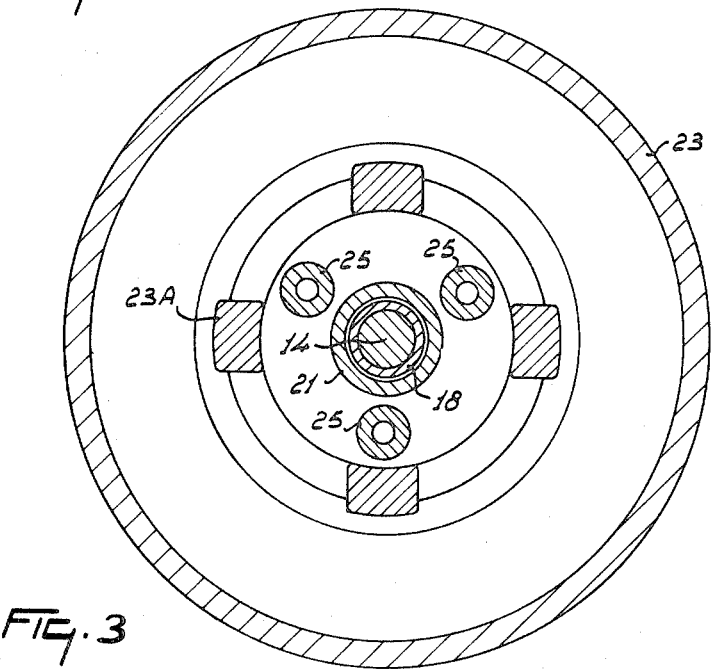
FIGS. 3, 5 and 7 are sections taken on the lines III—III, V—V and VII—VII of FIGS. 2, 4 and 6 respectively.

FIGS. 2 and 3 show one embodiment of the variable ratio transmission 9 rotatably mounted on a central shaft 14 (also shown in FIG. 1) at the free end of a bifurcated control arm 16. This control arm may correspond to the control arm 11 of FIG. 1 and it will be seen that the shaft 14 is secured to the two parts of the control arm 16 by nuts 17 screwed onto threaded projections of the opposite ends of the shaft 14, which projections are entered through holes in the two parts of the arm 16. The central shaft 14 is surrounded by a sleeve 18 provided with ball bearings 19 at its opposite ends. Two supports 21 surround the sleeve 18 and are formed with overlapping flanges 22 around a central region of said sleeve. Each support 21 is integrally connected to a corresponding profiled disc 20 at the end thereof remote from the flanges 22 which latter are designed to center the discs 20 reliably around the bearings 19 upon which bearings the two supports 21 are respectively mounted. Three coupling shafts 25 extend between the two supports 21 and the two discs 20 are fixedly secured to opposite ends of said shafts 25 by bolts 26 whose heads are sunk into recesses in the discs 20. It is thus ensured that the two discs 20 and their supports 21 are fastened in rotation with one another.

Between the two discs 20 a third central profiled disc 23 is mounted so as to be displaceable lengthwise of the sleeve 18. To this end, it has a broad support 24 that slidably surrounds said sleeve 18. Moreover, the support 24 also slidably surrounds the three coupling shafts 25 that interconnect the discs 20 in such a way that about 35 percent of the surface area of the profiled disc 23 is in slidable contact with the three shafts 25. V-belts or the like 27 and 28 are lodged in the grooves of the two pulleys which are, effectively, formed between the two discs 20 and the opposite sides of the slidable profiled disc 23. It can be seen from FIG. 3 of the drawings that the three coupling shafts 25 are angularly offset at 120° intervals from one another around the longitudinal axis of the shaft 14 and that the disc 23 is integrally connected to its slidable foot or support 24 only by four short spokes 23A which are also angularly offset from one another around the axis just mentioned at 90° intervals. The variable ratio transmission which has been described is infinitely variable between minimum and maximum transmission ratio values and can be manufactured cheaply and easily because it is made from parts that do not require any machining to a fine degree of accuracy. The transmission operates effectively and the replacement of any parts thereof that become worn or damaged is a simple matter requiring only an average degree of mechanical skill upon the part of an operative making the required substitution.

Figure 4:
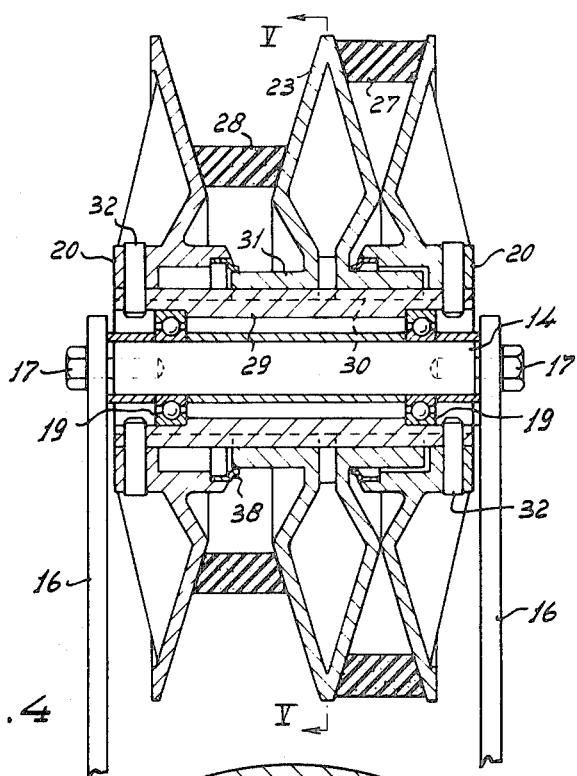
Figure 5:
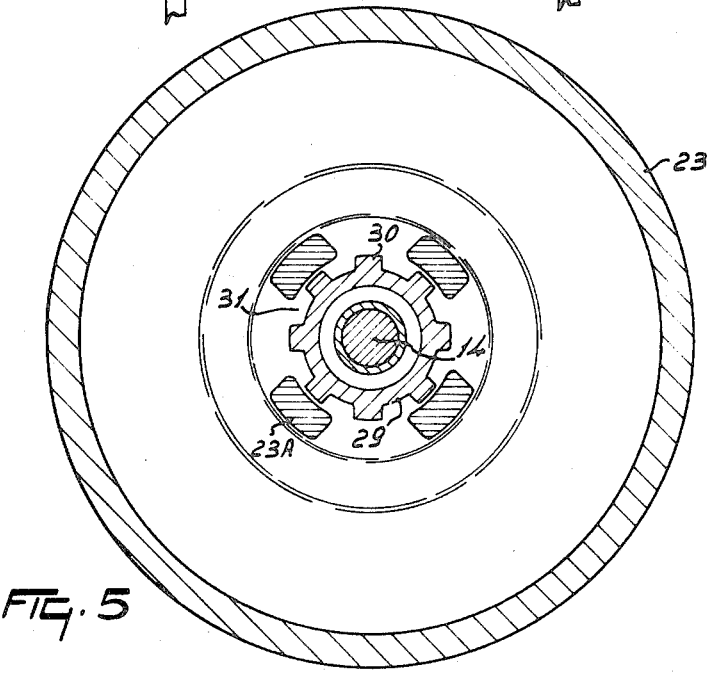

FIGS. 4 and 5 of the drawings show an alternative embodiment in which a coupling shaft 29 is secured to the bearings 19 in coaxial surrounding relationship therewith. The external surface of the tubular shaft 29 is formed with eight regularly spaced-apart longitudinal splines 30 between which eight longitudinal grooves extend. A foot or support 31 of the profiled disc 23 is formed with matching internal grooves and splines and is mounted on the splined coupling shaft 29 so as to be fast in rotation therewith but freely slidably axially between the two profiled discs 20. The two discs 20 are rendered substantially immovable relative to one another by fastening both of them to opposite end regions of the coupling shaft 29 with the aid of dowels or keys 32. It will, of course, be appreciated that those parts which are similar or identical to parts that have already been described in FIGS. 2 and 3 of the drawings are designated in FIGS. 4 and 5 by the same reference numerals as are employed in FIGS. 2 and 3.

Figure 6:
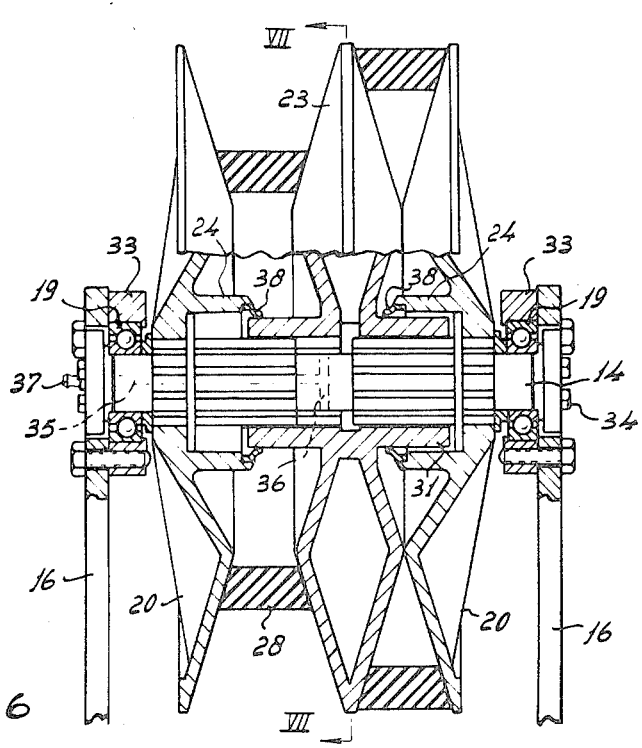
Figure 7:
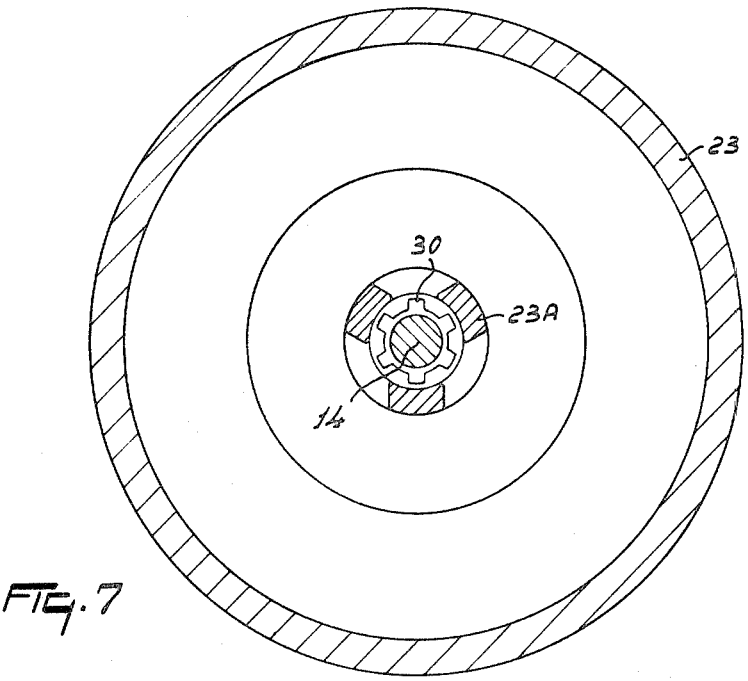

FIGS. 6 and 7 of the drawings illustrate a further embodiment of the variable ratio transmission and, in this case, the central shaft 14 itself constitutes a coupling member between the discs 20 and is rotatable relative to the control arm 16 rather than being rigidly secured thereto. The splines 30 are formed directly upon the outer surface of the shaft 14 throughout the greater part of the length thereof and, once again, the foot or support 31 of the central slidably mounted disc 23 is formed with cooperating internal grooves and splines arranged to render said disc 23 secured in rotation with the shaft 14 but slidable axially therealong between the discs 20. The ball (or roller) bearings 19 are, in this case, arranged with their outer races secured to the ends of the two halves of the control arm 16 by clamps 33 and bolts 34. Opposite plain end regions of the central shaft 14 are mounted in the inner races of the bearings 19, one end of said shaft 14 being formed with a central bore 35 which communicates midway along the shaft with a transverse bore 36 by which grease or other lubricant can reach the splines 30 and other parts of the transmission. A grease nipple or the like 37 may be provided for feeding lubricant to the central bore 35 or, alternatively, the bore 35 may be in communication with the general lubricating system of an agricultural implement such as the combine harvester 2. In order to prevent grease or other lubricant from contaminating the belt-engaging surfaces of the discs 20 and 23, seals 38 are provided between the supports 24 of the discs 20 and the support 31 of the disc 23. It will be seen from Fig 6 that the arrangement is such that, in this case, the foot or support 31 is of smaller diameter than the supports 24 and telescopes into one or other of the latter supports upon movement of the disc 23 towards one or other of the discs 20.

FIGS. 8 and 9 of the drawings illustrate a construction of the control mechanism for the variable ratio transmission in which said transmission 9 is rotatably mounted at the free end of a control arm 39 which arm is connected, intermediate its ends, to the piston rod 40 of a hydraulic or other fluid pressure operated piston and cylinder assembly 41. The cylinder of the assembly 41 is pivotally mounted upon a substantially horizontal stub shaft 42 and is prevented from becoming accidentally disconnected from that stub shaft by a transverse pin 62. There may be a direct pivotal connection between the piston rod and the control arm as illustrated in FIG. 1 or an indirect connection of the kind illustrated in FIGS. 8 and 9 that will be described below. As shown in FIGS. 8 and 9, the control arm 39 is pivotally connected with a rod system 43 which is itself pivotally connected to a plate-shaped supporting bracket 44. The bracket 44 is secured to a wall of the combine harvester 2 by bolts 45 with the provision of intervening spacers 60 that will be mentioned again hereinafter. The rod system 43 includes a setting device 46 for the upward and downward adjustment of the arm 39. The setting device 46 advantageously takes the form of a bolt 47 carrying two lock nuts 48 and 49. The bolt 47 is entered transversely through a hollow shaft 50 that projects from the bracket 44 and the two lock nuts 48 and 49 are tightened against the opposite sides of the shaft 50 to maintain the bolt 47 in a chosen position.

The rod system 43 includes two sleeves 51 and 52, the sleeve 52 being rotatably journaled around a shaft 53 which interconnects the ends of two arms 54 and 55. The shaft 53 is connected to the arms 54 and 55 in such a way as to be readily releasable therefrom. The sleeve 51 turnably surrounds a shaft 56 one end of which is rigid with the bracket 44. The ends of the two parts of the control arm 39 are fastened to the sleeve 52 and a further sleeve 52A surrounds a pin 53A that interconnects the two halves of the arm 39 approximately midway along the length thereof. An eye 57 projects from the sleeve 52A and a short pivot pin 58 is employed to connect the eye to a fork at the free end of the piston rod 40. The pivot pin 58 thus establishes a connection between the piston rod 40 and the rod system 43. The sleeve 51 is provided midway along its length with a projecting arm 59 against which bears the end of the shank of the bolt 47.

In the use of the setting device 46, the operator of the combine harvester varies the hydraulic pressure in the cylinder 41 to extend or retract the piston rod 40 as required. The angular setting of the control arm 39 is thus changed and the variable ratio transmission is turned through an arc of its possible curved path of movement. This results in a displacement of the disc 23 axially along the shaft 14 so that the belt that is driven by the pulley 4 (i.e. the belt 5 in FIGS. 1 and 8) is brought closer to, or further away from, the central shaft 14. The belt which drives the pulley 8 (i.e., the belt 6 in FIGS. 1 and 8) is moved in a corresponding opposite direction further away from or closer to the shaft 14. It will be readily apparent that this will change the transmission ratio between the rotary output shaft 3 and the driven ground wheels 7.

After many hours of operation, the V-belts or the like 5 and 6 or 27 and 28 will wear to some extent and will probably also stretch to some extent. The control system requires adjustment to compensate for the wear and elongation and its is generally desirable to realign the transmission belts. To this end, the spacers 60 are arranged to enable the whole control system to be displaced laterally. Spacers 60 (not illustrated) are, preferably, also provided on the stub shaft 42 between the wall of the combine harvester 2 and the end of the cylinder 41. It is preferred to form the stub shaft 42 with a plurality of transverse holes similar to the holes 61 shown in FIGS. 11 and 12 of the drawings so that the transverse pin 62 can be entered through any chosen one of the holes 61 to allow the pivotally mounted end of the cylinder 41 to be moved short distances laterally of the combine harvester 2 as required.

FIGS. 10, 11 and 12 of the drawings show an alternative construction of the control and aligning mechanism which may be employed in association with the variable ratio transmission 9. In this case, the rod system 43 is replaced by a bracket 63 that can be displaced axially along a setting shaft 65, two of the previously mentioned transverse pins 62 being entered through the holes 61 in said shaft 65 to maintain the bracket 63 at the desired location therealong. The bracket 63 carries a projecting screw-threaded stud 64 to which the base of the bifurcated control arm 16 can be secured in a desired position by opposed lock nuts 66 and 67 in the manner illustrated in the drawings. The setting shaft 65 is once again fastened to the supporting bracket 44 which, in this case, is of triangular configuration. The spacers 60 can again be used to adjust the position of bracket 44 laterally from the wall of the combine harvester 2. The upward or downward adjustment of the variable ratio transmission 9 is effected by suitable adjustment of the lock nuts 66 and 67, the bracket 63 being adjustable axially along the setting shaft 65 by entering the pins 62 through appropriate holes 61.

FIGS. 13 and 14 of the drawings show an arrangement by which fine adjustment of the position of the transmission belts can be effected. The mechanism is arranged to displace the control arm 16, and thus the variable ratio transmission 9 and the bracket 63, through desired small distances. The setting shaft 65 is replaced by a hollow setting shaft 71 formed with a longitudinally extending slot which can be seen in FIG. 14 of the drawings. The bracket 63 is replaced by a bracket 68 which surrounds a ring 69 provided with a projection 70 that is entered through the longitudinal slot in the hollow shaft 71. The projection 70 is enlarged internally of the shaft 71 to form an internally screw-threaded sleeve through which a correspondingly externally screw-threaded shaft 72 is entered. The shaft 72 is connected to the free end of the hollow shaft 71 in such a way as to be rotatable, but substantially axially immovable, relative thereto with the aid of a crank 73. It will be apparent that rotation of the crank 73 is one or other direction will cause the ring 69 and the bracket 68 which it carries to move axially along the hollow shaft 71 either towards, or away from the wall of the combine harvester 2. This form of adjustment allows very small displacements of the control arm 16 to be obtained when required.

Variable ratio transmissions in accordance with the invention provide a simple but reliable way of changing the speed motion of various parts in response to an unchanging speed of rotation of a driving shaft, the control and alignment mechanisms that have been described being usable in conjunction therewith to control the drive in a simple manner and maintain efficient operation.

Having thus described my invention what I claim as new and desire to secure by Letters Patent of the United States is:

1. An infinitely variable ratio transmission intended for use in an agricultural implement, the transmission comprising: a central shaft; two discs which are laterally spaced apart rotatably carried on said shaft; a third disc carried on said shaft between said two discs which is movable axially along said shaft; said discs including torque transmitting surfaces each coinciding with conical surfaces arranged to cooperate in receiving driving and driven V-belt members; coupling means interconnecting said two discs, said coupling means coupling the rotation of said third disc with that of said two discs independently of tensions from said V-belt members and being arranged to drive said third disc positively with said two discs, said coupling means comprising a hollow shaft having external splines arranged to cooperate slidably with internal splines provided on said third disc.

2. A transmission as claimed in claim 1, wherein said third disc includes a support part extending lengthwise of said coupling means whereby there is an adequate area of slidable contact between said third disc and said coupling means.

3. A transmission as claimed in claim 2 wherein said third disc is formed with internal splines arranged to cooperate slidably with external splines provided on said coupling means.

4. A transmission as claimed in claim 1 wherein said hollow coupling shaft rotatably surrounds said control shaft and has said two discs affixed to its opposite ends.

5. A transmission as claimed in claim 1 wherein said third disc includes a support part extending lengthwise of said coupling means whereby there is an adequate area of slideable contact between said third disc and said coupling means.

6. A transmission as claimed in claim 5 wherein said two discs are provided with support parts in a surrounding relationship with said support part of said third disc, seals provided between said cooperating support parts to restrict the egress of lubricant with said support parts towards the torque-transmitting surfaces of said discs.

7. An infinitely variable ratio transmission intended for use in an agricultural implement, the transmission comprising: a central shaft; two discs which are laterally spaced apart rotatably carried on said shaft; a third disc carried on said shaft between said two discs which is movable axially along said shaft; said discs including torque-transmitting surfaces each coinciding with conical surfaces arranged to cooperate in receiving driving and driven V-belt members; coupling means interconnecting said two discs, said coupling means coupling the rotation of said third disc with that of said two discs independently of tensions from said V-belt members and being arranged to drive said third disc positively with said two discs, said coupling means comprising a hollow coupling shaft rotatably surrounding said central shaft, said coupling shaft having said two discs affixed to its opposite ends.

8. A transmission as claimed in claim 7 wherein the external surface of said hollow shaft is provided with longitudinal splines arranged to cooperate with internal splines provided on said third disc.

9. An infinitely variable ratio transmission intended for use in an agricultural implement, the transmission comprising: a central shaft; two discs which are laterally spaced apart rotatably carried on said shaft; a third disc carried on said shaft between said two discs which is movable axially along said shaft; said discs including torque-transmitting surfaces each coinciding with conical surfaces arranged to cooperate in receiving driving and driven V-belt members; coupling means interconnecting said two discs, said coupling means coupling the rotation of said third disc with that of said two discs independently of tensions from said V-belt members and being arranged to drive said third disc positively with said two discs, said third disc including a support part extending lengthwise of said coupling means whereby there is an adequate area of slideable contact between said third disc and said coupling means, said third disc being formed with internal splines arranged to cooperate slidably with external splines provided on said coupling means, said two discs being provided with support parts in a surrounding relationship with said support part of said third disc, seals being provided between said cooperating support parts to restrict the egress of lubricant within said support parts towards the torque-transmitting surfaces of said discs.

10. An infinitely variable ratio transmission intended to use in an agricultural implement, the transmission comprising a central shaft; two discs which are laterally spaced apart rotatably carried on said shaft; a third disc carried between said two discs which is movable axially along said shaft; driving and driven V-belt members, said discs including torque-transmitting surfaces each coinciding with conical surfaces arranged to cooperate in receiving said driving and driven V-belt members; fluid pressure operated control mechanism governing the transmission ratio between said driving and driven V-belt members, said control mechanism including means for correctly aligning said V-belt members; said central shaft and said discs being mounted on a pivotable control arm, said arm being pivotally connected to the piston rod of a fluid pressure operated piston and cylinder assembly, said arm further connected to a rod system which is adjustable upwardly, downwardly and laterally with respect to said V-belt members, said piston and cylinder assembly being connected to a first setting shaft and to said arm, said arm being connected to a second setting shaft through the intermediary of a fine adjusting mechanism.

11. A transmission as claimed in claim 10, wherein said two setting shafts are each provided with a screw thread along which a cooperating screw-threaded sleeve is displacable, the arrangement being such that said sleeve moves axially only upon rotating of said screw-threaded shaft in said sleeve, and wherein the piston and cylinder assembly and said arm are both pivotally connected to corresponding of said sleeves.

12. A transmission as claimed in claim 10, wherein said setting shafts are formed with a plurality of transverse holes, transverse pins being entered into selected of said holes to secure parts connected to said shafts in selected axial settings therealong.

13. An infinitely variable ratio transmission intended for use in an agricultural implement, the transmission comprising a central shaft; two discs which are laterally spaced apart rotatably carried on said shaft; a third disc carried between said two discs which is movable axially along said shaft; driving and driven V-belt members, said discs including torque-transmitting surfaces each coinciding with conical surfaces arranged to cooperate in receiving said driving and driven V-belt members; fluid-pressure operated control mechanism governing the transmission ratio between said driving and driven V-belt members, said control mechanism including means for correctly aligning said V-belt members; said central shaft and said discs being mounted on a pivotable control arm, said arm being pivotally connected to the piston rod of a fluid-pressure-operated piston and cylinder assembly, said arm further connected to a rod system which is adjustable upwardly, downwardly and laterally with respect to said V-belt members, said rod system comprising a rod, a setting device adapted to adjust said arm upwardly and downwardly, a bracket, and a setting bolt provided with lock nuts arranged between said rod and said bracket whereby said rod system is secured to a supporting part of an agricultural implement during the use of the transmission.

14. A transmission as claimed in claim 13 comprising a hollow shaft and an arm part, said setting bolt being adjustably mounted on said hollow shaft and bearing against said arm part, said arm part being perpendicular relative to said hollow shaft, said hollow shaft being fastened to said bracket and said arm part being secured to said rod, whereby said setting bolt forms an adjustable part of a supporting structure for the transmission.

* * * * *